US008282118B1

(12) United States Patent
De La Fuente, Sr.

(10) Patent No.: US 8,282,118 B1
(45) Date of Patent: Oct. 9, 2012

(54) TOW BAR ASSEMBLY APPARATUS

(76) Inventor: Leonard De La Fuente, Sr., Houston, TX (US)

( * ) Notice: Subject to any disclaimer, the term of this patent is extended or adjusted under 35 U.S.C. 154(b) by 180 days.

(21) Appl. No.: 12/840,046

(22) Filed: Jul. 20, 2010

Related U.S. Application Data

(62) Division of application No. 11/832,175, filed on Aug. 1, 2007, now abandoned.

(51) Int. Cl.
*B62B 1/00* (2006.01)
(52) U.S. Cl. .................................... 280/476.1; 280/493
(58) Field of Classification Search ............... 280/476.1, 280/492, 493
See application file for complete search history.

(56) References Cited

U.S. PATENT DOCUMENTS

| 2,309,204 | A | * | 1/1943 | Nelson | 280/476.1 |
| 2,844,389 | A | * | 7/1958 | Burnett | 280/476.1 |
| 3,189,365 | A | * | 6/1965 | Blacher | 280/47.24 |
| 3,622,181 | A | * | 11/1971 | Smith | 280/476.1 |
| 4,253,679 | A | * | 3/1981 | Sargent | 280/405.1 |
| 5,382,041 | A | * | 1/1995 | Keith | 280/476.1 |
| 7,845,670 | B2 | * | 12/2010 | Oberg | 280/476.1 |

* cited by examiner

*Primary Examiner* — Kevin Hurley

(57) ABSTRACT

The tow bar assembly apparatus is offered in more than one embodiment. The most basic embodiment provides for coupling between two balls designed for receipt of a hitch socket. The second embodiment provides the same function, with the addition of another socket assembly on one end of the bar, whereby a height choice is provided. The third embodiment of the apparatus provides either or both of the above described bar assemblies with the addition of a dolly assembly.

12 Claims, 5 Drawing Sheets

TOW BAR ASSEMBLY APPARATUS

TO ALL WHOM IT MAY CONCERN

Be it known that I, Leonard De La Fuente, Sr., a citizen of the United States, have invented new and useful improvements in a tow bar assembly apparatus as described in this specification.

BACKGROUND OF THE INVENTION

Ball hitches are typically used on trailers and automobiles for towing trailers and other towed vehicles. Ball hitches are used on front as well as the back of various towing vehicles. Socket hitches are used on the towed vehicles. There are times when a tow vehicle ball and towed vehicle socket are not adequate for the desired use or application. An example of such a time is when a boat is put in or pulled out of the water, the boat being on a trailer. Often, the relatively brief distance between the boat and tow vehicle is inadequate, as water may be deep, the road surface slick, the ramp steep, or the like. Partial submersion of the tow vehicle is often experienced, undesirably. An added example of hitch inadequacy can be cited wherein a disabled tow vehicle is in need of movement. In such situations, a means is needed for a mobile tow vehicle to move the disabled tow vehicle, where no means other than manual effort has previously existed. In such instances, a connection between two balls is required. The present apparatus solves these problems.

FIELD OF THE INVENTION

The tow bar assembly apparatus relates to ball and socket hitches and more especially to a tow bar assembly apparatus which provides for temporarily joining one ball to another, or for extending the length of a coupling between a tow vehicle and a towed vehicle.

SUMMARY OF THE INVENTION

The general purpose of the tow bar assembly apparatus, described subsequently in greater detail, is to provide a tow bar assembly apparatus which has many novel features that result in an improved tow bar assembly apparatus which is not anticipated, rendered obvious, suggested, or even implied by prior art, either alone or in combination thereof.

To attain this, the tow bar assembly apparatus is offered in more than one embodiment. The most basic embodiment provides for coupling between two balls, each designed for receipt of a hitch socket. The second embodiment provides the same function, with the addition of a dual socket assembly on one end of the bar, whereby a height choice is provided. The third embodiment of the apparatus provides either or both of the above described bar assemblies with the addition of a dolly assembly.

Thus has been broadly outlined the more important features of the improved tow bar assembly apparatus so that the detailed description thereof that follows may be better understood and in order that the present contribution to the art may be better appreciated.

An object of the tow bar assembly apparatus is to be basic.

Another object of the tow bar assembly apparatus is to be inexpensively manufactured and sold.

A further object of the tow bar assembly apparatus is to provide for coupling between two ball assemblies.

An added object of the tow bar assembly apparatus is to provide an extended length between the coupling of a ball assembly and a socket assembly.

And, an object of the tow bar assembly apparatus is to provide added wheeled support between a coupling of a ball assembly and a socket assembly of hitches.

These together with additional objects, features and advantages of the improved tow bar assembly apparatus will be readily apparent to those of ordinary skill in the art upon reading the following detailed description of presently preferred, but nonetheless illustrative, embodiments of the improved tow bar assembly apparatus when taken in conjunction with the accompanying drawings.

In this respect, before explaining the current embodiments of the improved tow bar assembly apparatus in detail, it is to be understood that the tow bar assembly apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved tow bar assembly apparatus. It is therefore important that the claims be regarded as including such equivalent constructions insofar as they do not depart from the spirit and scope of the tow bar assembly apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the tow bar assembly apparatus generally designated by the reference number 10 will be described.

Figure 1:
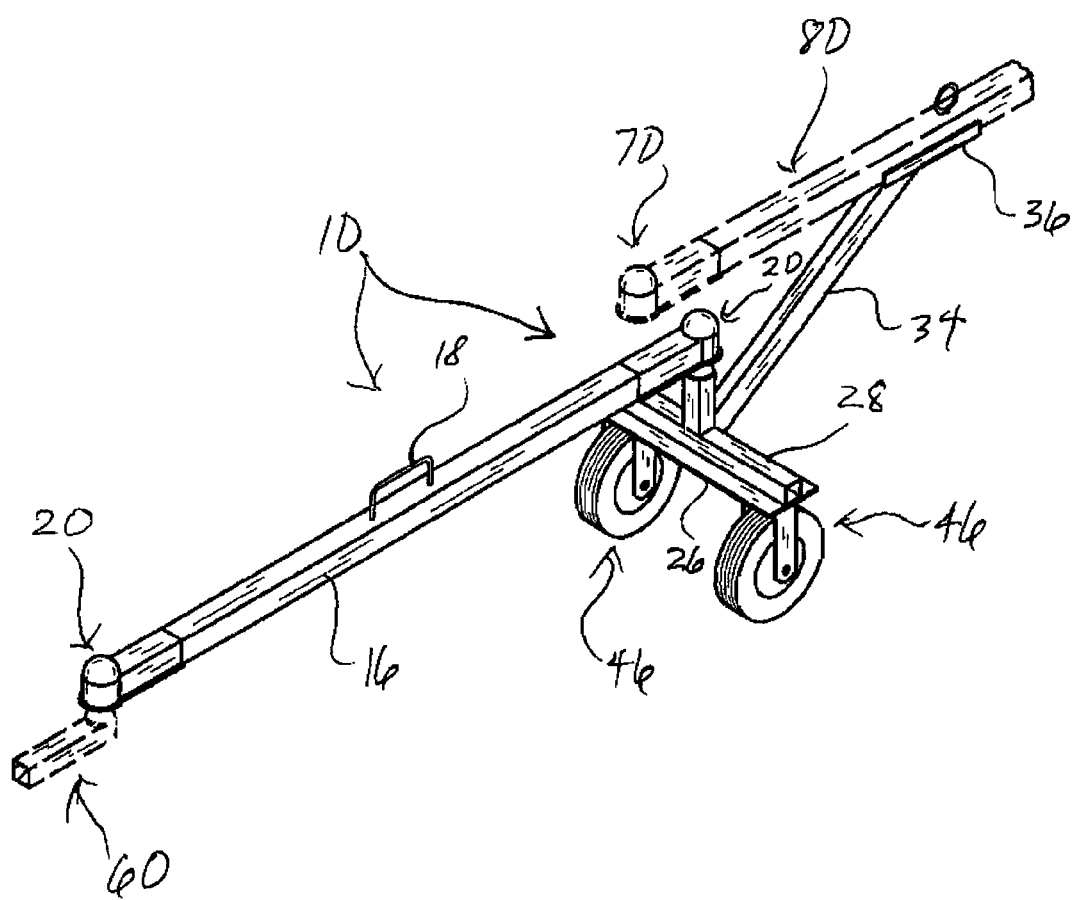
FIG. 1 is a perspective view apparatus hooked to an existing trailer tongue.
Figure 2:
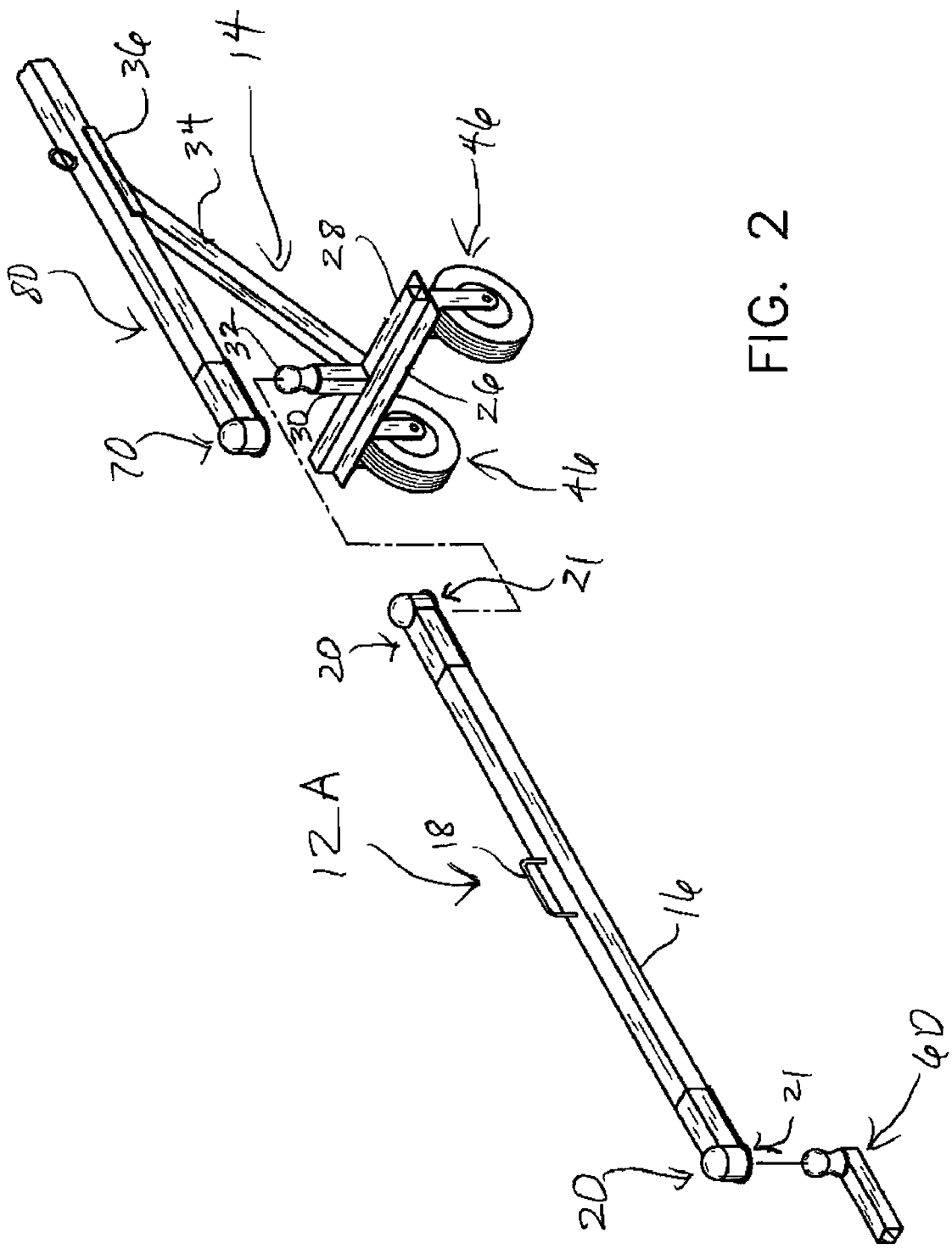
FIG. 2 is a perspective view of the bar assembly disconnected from an existing ball assembly and from the dolly assembly, the dolly assembly connected to an existing trailer tongue.
Figure 3:
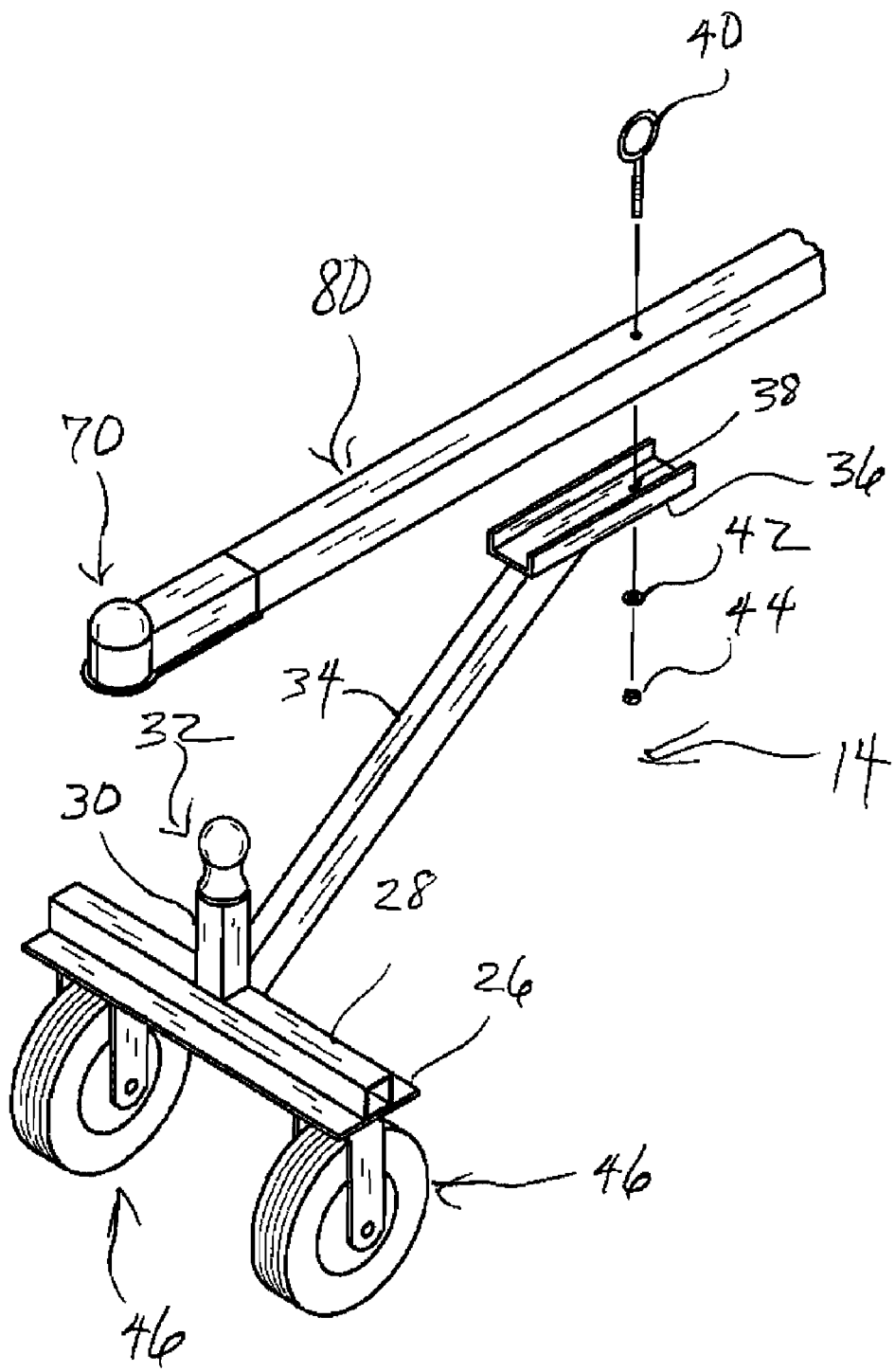
FIG. 3 is a perspective view of the dolly assembly in preparation for connection to an existing trailer tongue.
Figure 4:
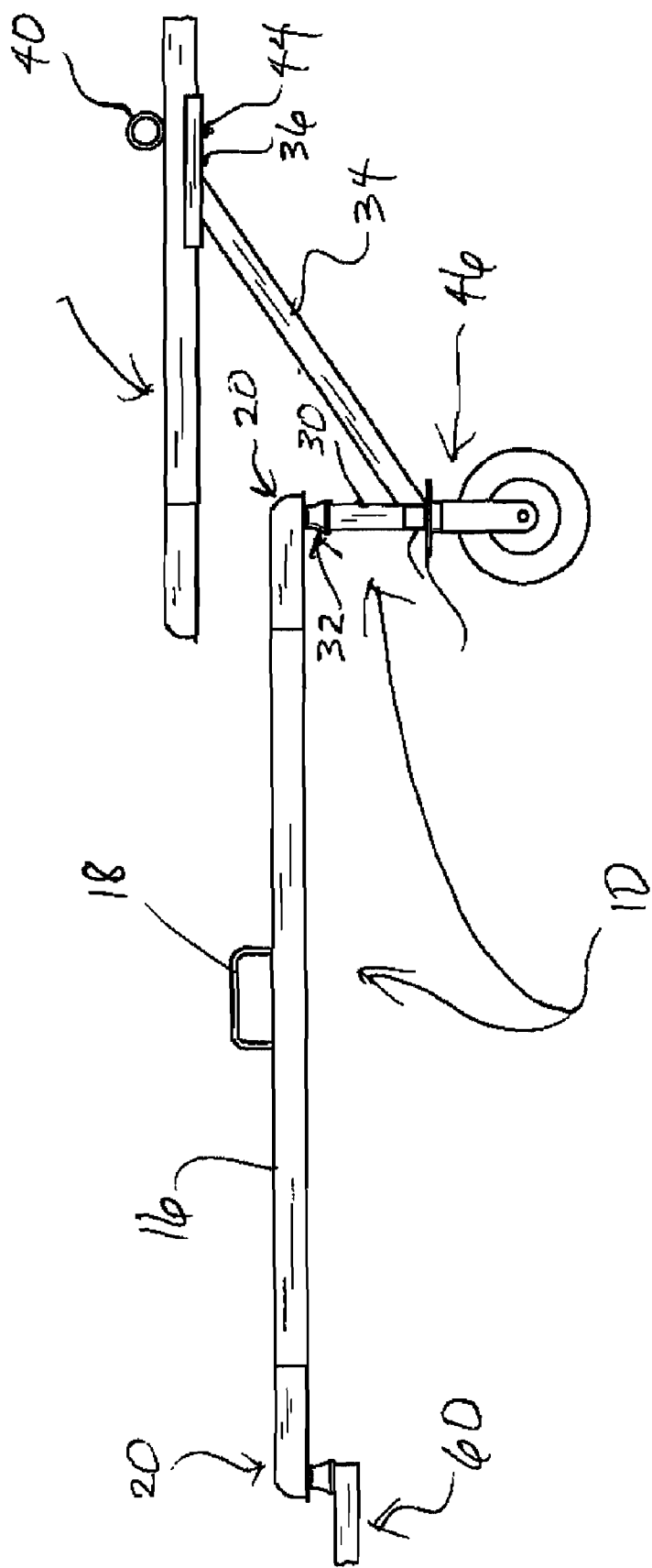
FIG. 4 is a lateral elevation view of FIG. 1.
Figure 5:
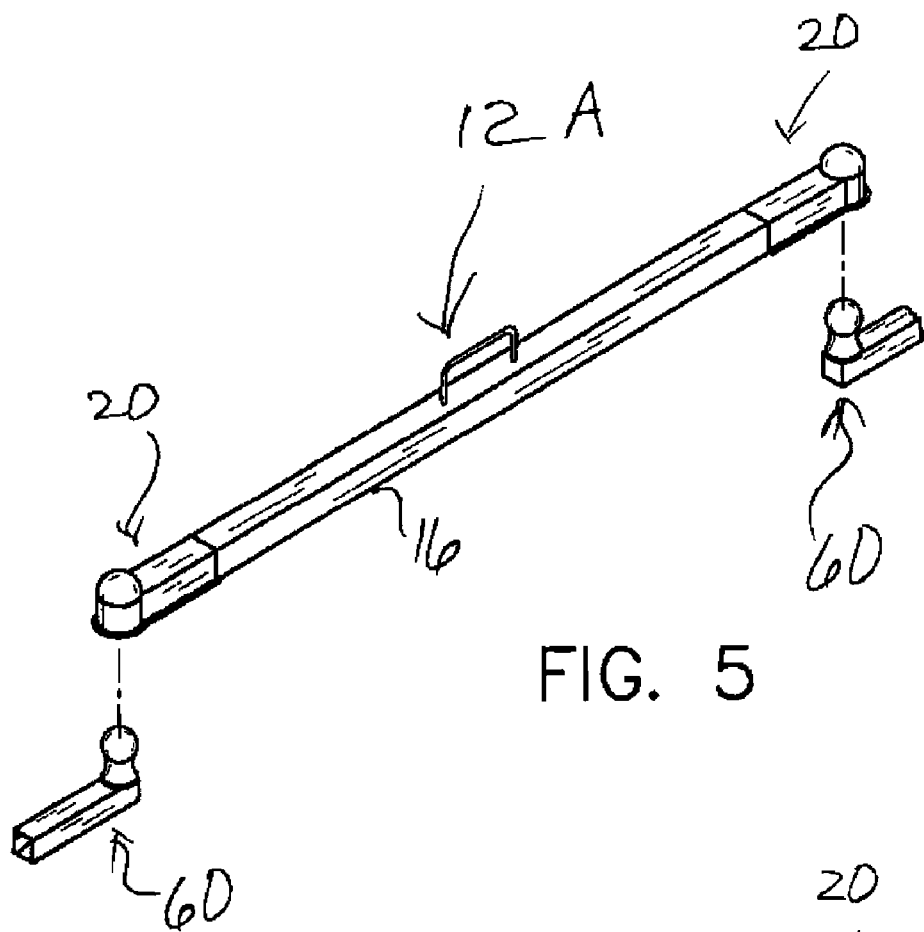
FIG. 5 is a perspective view of the bar assembly in preparation of engagement with a pair of existing ball assemblies.

Referring to FIG. 5, one embodiment of the apparatus 10 comprises the tow bar assembly 12A embodiment. Tow bar assembly 12A is provided for use with a tow vehicle and a towed vehicle. The apparatus 12A comprises a bar 16 having a first end, a second end, and a length therebetween. The bar 16 is ideally comprised of square stock metal material. The bar 16 further comprises the handle 18. The handle 18 is disposed in about the center of the bar 16 in the embodiments of the bar assembly 12A and 12B. Slight variations in handle 18 location exist between the two embodiments in order to better balance the bar assemblies 12A and 12B in lifting by the handle 18. The handle 18 provides for either manual or assisted lifting of the bar assemblies 12A and 12B. The handle 18 is on the side of the bar 16 opposite the socket openings 21. The first socket assembly 20 is disposed on the first end of the bar 16. The first socket assembly 20 is for coupling with an existing ball assembly 60 of the tow vehicle.

The second socket assembly 20 is identical to the first socket assembly 20, and is disposed on the second end of the bar 16. The second socket assembly 20 is for coupling with an existing ball assembly 60 of the towed vehicle. The bar assembly 12A provides for a mobile tow vehicle to transport an immobile towed vehicle with an existing ball assembly 60.

Figure 6:
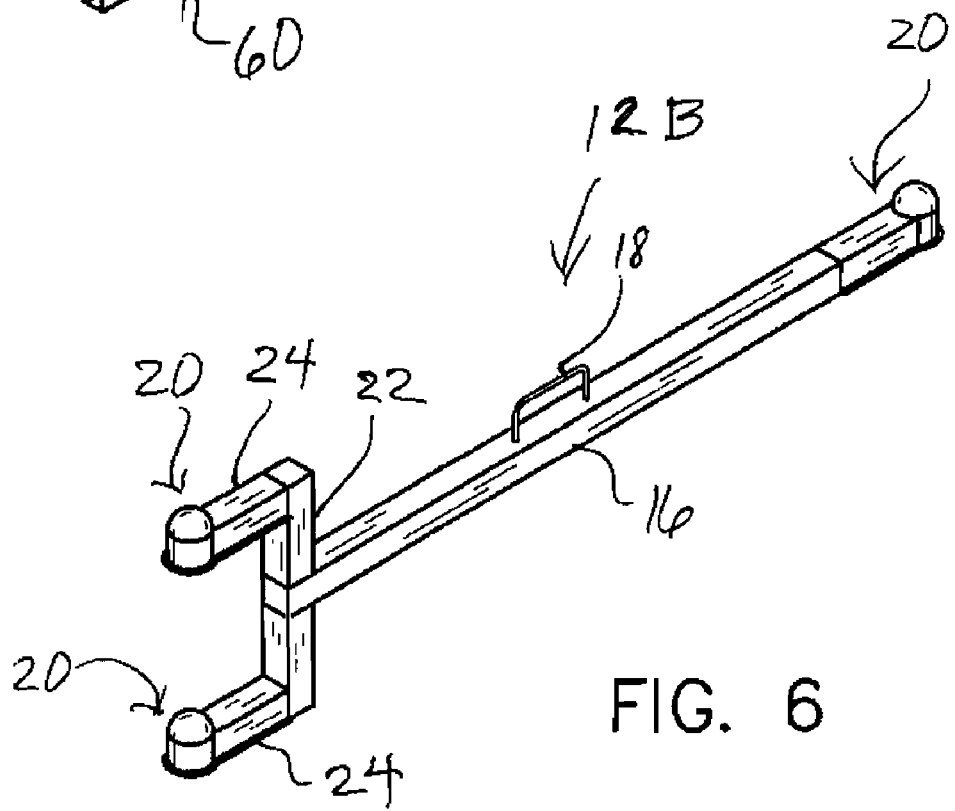
FIG. 6 is an alternate bar assembly embodiment.

Referring to FIG. 6, an alternate embodiment of the apparatus 10 comprises the tow bar assembly 12B. The embodiment 12B is for use with a tow vehicle and a towed vehicle. The apparatus 12B comprises the bar 16 having a first end, a second end, and a length therebetween. The first socket assembly 20 is disposed on the first end of the bar 16. The first socket assembly 20 is for coupling with an existing ball assembly 60 of the tow vehicle. The vertical 22 is disposed on the second end of the bar 16. The vertical 22 has a first end and a second end. A horizontal 24 is disposed on the first end of the vertical 22. The identical horizontal 24 is disposed on the second end of the vertical 22. The second socket assembly 20 is disposed on the end of the first horizontal 24. The third socket assembly 20 is disposed on the end of the second horizontal 24. Each of the second socket assembly 20 and third socket 20 are identical to the first socket assembly 20. Each of the second socket assembly 20 and the third socket assembly 20 is for selectively coupling with an existing ball assembly 60 of the towed vehicle or tow vehicle, depending upon user choice. The second socket assembly 20 and the third socket assembly 20 are therefore available for coupling, individually as chosen, with an existing ball assembly 60 of either vehicle, as needed.

The second socket assembly 20 is spaced vertically apart from the third socket assembly 20 to provide for a choice in height in coupling to the chosen tow vehicle or towed vehicle.

Referring to FIGS. 1-4, the most complete embodiment of the tow bar assembly apparatus 10 is for use with a tow vehicle and a towed vehicle. The most complete embodiment of apparatus 10 comprises the tow bar assembly 12A and dolly assembly 14 in combination. Either bar assembly 12A or 12B is appropriate for use with the dolly assembly 14. The dolly assembly 14 comprises the transverse 26. The transverse 26 has a first end, a second end, and a length therebetween. The most complete embodiment of the apparatus 10 provides the brace 28 which is affixed to the top of the length of the transverse 26, thereby offering greater rigidity. The angle support 34 is affixed to the transverse 26 and the brace 28 at an angle. One wheel assembly 46 is affixed to the bottom side of each of the first and second ends of the transverse 26. Each wheel assembly 46 is ideally a swiveling wheel assembly 46, thereby providing easier maneuvering of the towed vehicle. The angle support 34 has a first end and a second end. The first end of the angle support 34 is affixed to the transverse 26. The horizontal member 36 is affixed to the second end of the transverse 26. The horizontal member 36 is in a horizontal plane equal to that of the transverse 26 and the brace 28. The horizontal member is further comprised of a channel whereby each side of the channel meets the sides of a tongue 80 of a trailer. The horizontal member 36 thereby further prevents pivot between the dolly assembly 14 and the existing tongue 80 at that point. The orifice 38 is disposed in the horizontal member 36. The eyebolt 40 and nut 44, with washer 42, are provided for selectively affixing the horizontal member 36 to an existing trailer tongue 80. The eyebolt 40 provides for lifting, as needed. The upright 30 is affixed to the brace 28. The ball 32 is affixed to the top of the upright 30. The ball 32 provides for coupling with the second socket assembly 20 of the bar 16.

With respect to the above description then, it is to be realized that the optimum dimensional relationships for the parts of the tow bar assembly apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the tow bar assembly apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the tow bar assembly apparatus may be used.

Therefore, the foregoing is considered as illustrative only of the principles of the tow bar assembly apparatus. Further, since numerous modifications and changes will readily occur to those skilled in the art, it is not desired to limit the tow bar assembly apparatus to the exact construction and operation shown and described, and accordingly, all suitable modifications and equivalents may be resorted to, falling within the scope of the tow bar assembly apparatus.

What is claimed is:

1. A tow bar assembly apparatus for use with a tow vehicle and a towed vehicle, the apparatus comprising, in combination:
   a bar having a first end, a second end, and a length therebetween;
   a first socket assembly on the first end of the bar, the socket assembly for coupling with an existing ball assembly of the tow vehicle;
   a second socket assembly on the second end of the bar;
   a dolly assembly, the dolly assembly comprising:
      a transverse having a first end, a second end, and a length therebetween;
      a wheel assembly affixed to a bottom side of each of the first and second end of the transverse;
      an angle support having a first end and a second end, the first end affixed to the transverse;
      a horizontal member comprised of a channel, the horizontal member affixed to the second end of the angle support, the horizontal member in a same horizontal plane of the transverse and brace;
      an orifice in the horizontal member;
      an eyebolt and nut for selectively affixing the horizontal member to an existing trailer tongue;
      an upright affixed to the transverse;
      a ball affixed to a top of the upright, the ball for coupling with the second socket assembly.

2. The apparatus according to claim 1 wherein the bar further comprises square material.

3. The apparatus according to claim 1 wherein the bar further comprises a handle, the handle disposed in about a center of the bar and on a side of the bar opposite an opening of each socket assembly.

4. The apparatus according to claim 2 wherein the bar further comprises a handle, the handle disposed in about a center of the bar and on a side of the bar opposite an opening of each socket assembly.

5. The apparatus according to claim 1 wherein the transverse further comprises a brace affixed to the length of the transverse;
   the angle support affixed to the transverse and brace, the upright affixed to the brace.

6. The apparatus according to claim 2 wherein the transverse further comprises a brace affixed to the length of the transverse;
   the angle support affixed to the transverse and brace.

7. The apparatus according to claim 3 wherein the transverse further comprises a brace affixed to the length of the transverse;
   the angle support affixed to the transverse and brace, the upright affixed to the brace.

8. The apparatus according to claim 4 wherein the transverse further comprises a brace affixed to the length of the transverse;
   the angle support affixed to the transverse and brace, the upright affixed to the brace.

9. The apparatus according to claim 5 wherein the transverse further comprises a brace affixed to the length of the transverse;
   the angle support affixed to the transverse and brace, the upright affixed to the brace.

10. The apparatus according to claim 7 wherein each wheel assembly further comprises a swivel.

11. The apparatus according to claim 9 wherein each wheel assembly further comprises a swivel.

12. The apparatus according to claim 10 wherein each wheel assembly further comprises a swivel.

* * * * *

UNITED STATES PATENT AND TRADEMARK OFFICE
CERTIFICATE OF CORRECTION

| | |
|---|---|
| PATENT NO. | : 8,282,118 B1 |
| APPLICATION NO. | : 12/840046 |
| DATED | : October 9, 2012 |
| INVENTOR(S) | : Lenord De La Fuente, Sr. |

It is certified that error appears in the above-identified patent and that said Letters Patent is hereby corrected as shown below:

Title page, item [76] the inventor's first name is spelled wrong. The inventor's name should read:

Lenord De La Fuente, Sr.

Signed and Sealed this
Nineteenth Day of March, 2013

Teresa Stanek Rea
*Acting Director of the United States Patent and Trademark Office*